Figure 1:
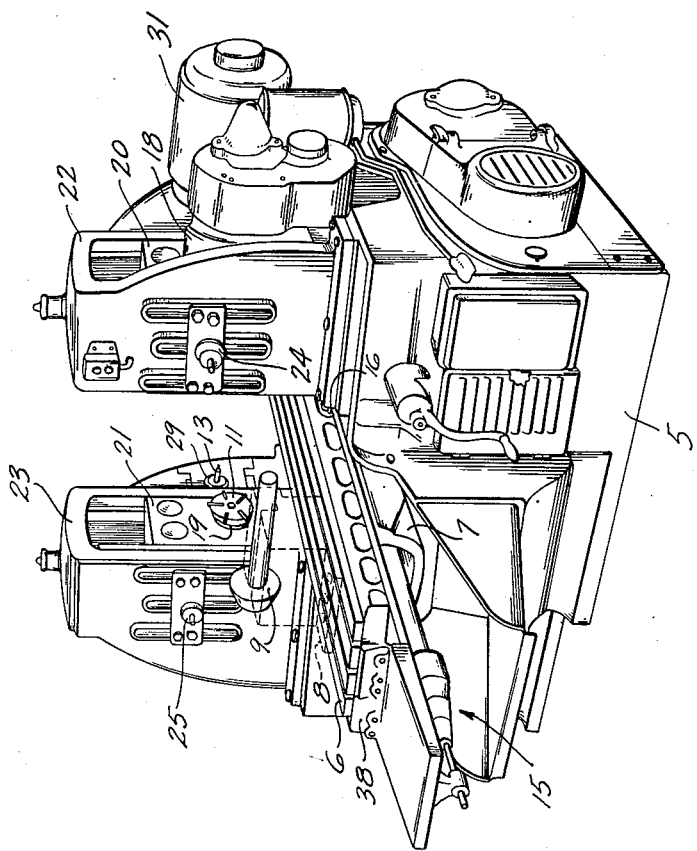

July 10, 1951 W. K. ANDREW ET AL 2,559,839
MACHINE TOOL POSITIONING MECHANISM
Filed Jan. 10, 1947 3 Sheets-Sheet 1

INVENTORS
William K. Andrew
Arthur H. Fotsch
BY W. D. O'Connor
Attorney

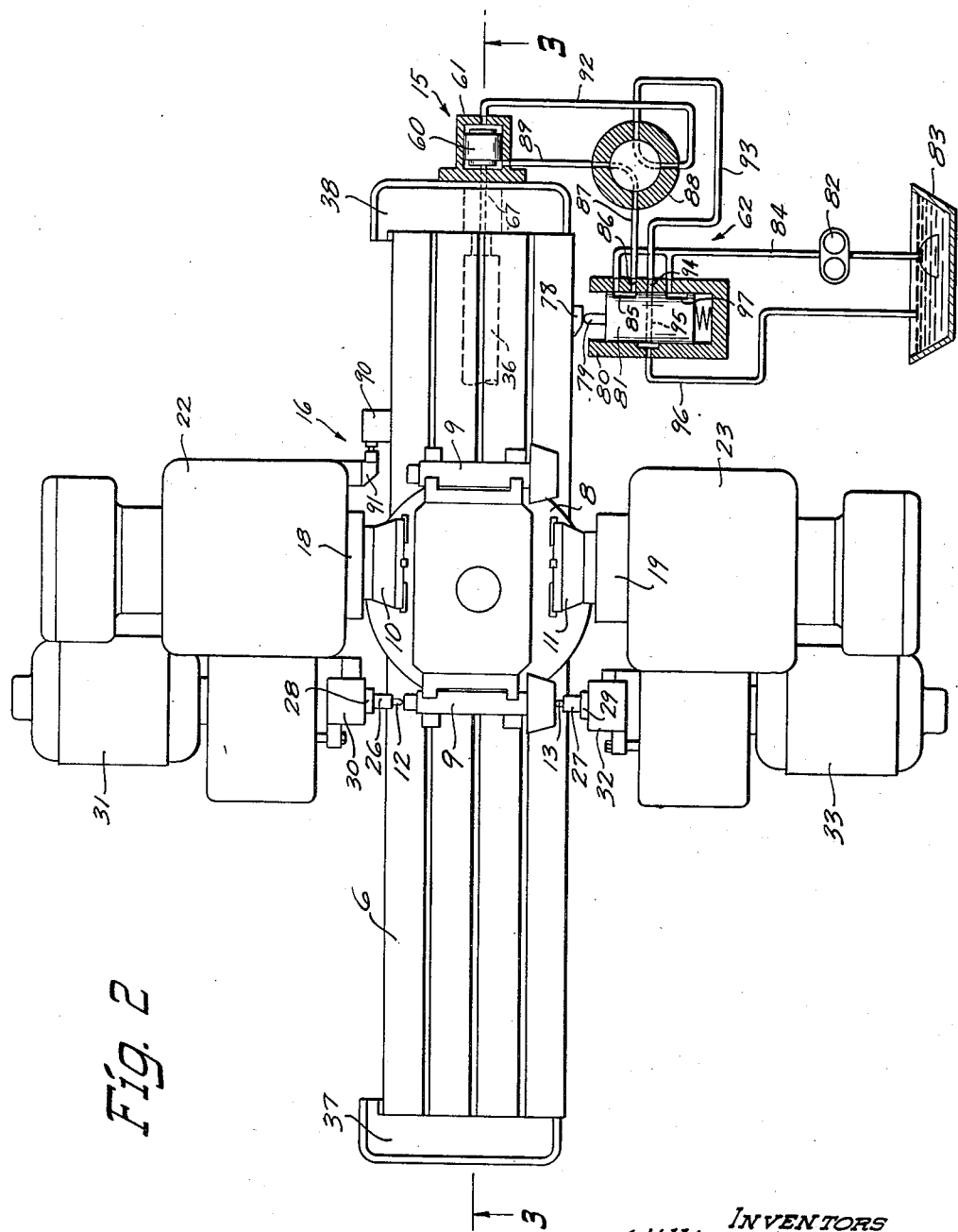

July 10, 1951  W. K. ANDREW ET AL  2,559,839
MACHINE TOOL POSITIONING MECHANISM
Filed Jan. 10, 1947  3 Sheets-Sheet 3
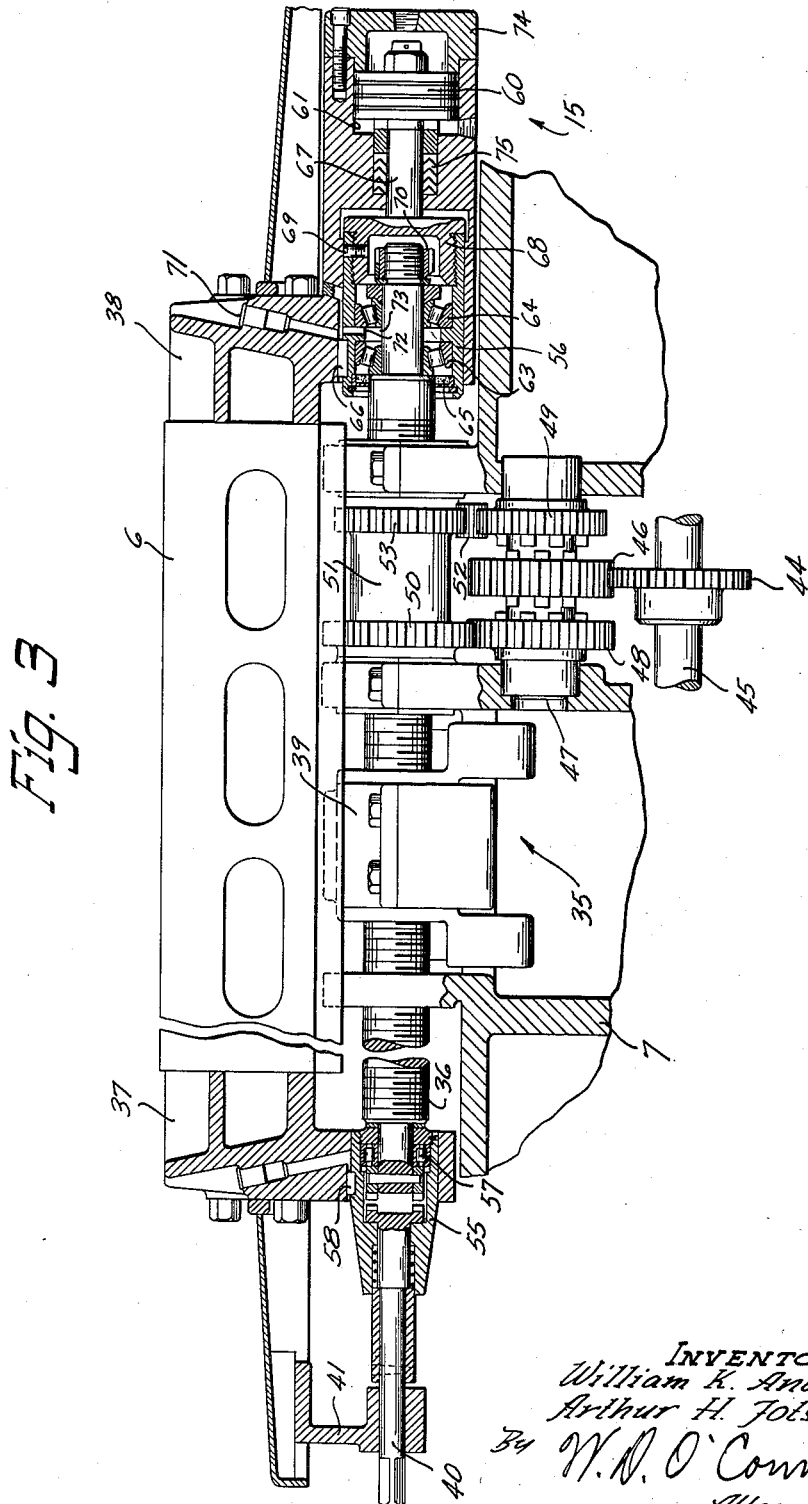
INVENTORS
William K. Andrew
Arthur H. Jotsch
By W. N. O'Connor
Attorney Patented July 10, 1951

2,559,839

UNITED STATES PATENT OFFICE 2,559,839

MACHINE TOOL POSITIONING MECHANISM

William K. Andrew, Wauwatosa, and Arthur H. Fotsch, West Allis, Wis., assignors to Kearney & Trecker Corporation, West Allis, Wis., a corporation of Wisconsin Application January 10, 1947, Serial No. 721,324

10 Claims. (Cl. 90—21)

This invention relates, generally, to improvements in machine tools and more particularly to an improved actuating and controlling mechanism for precisely positioning a movable member of a machine tool.

A general object of the invention is to provide an improved transmission mechanism for a machine tool.

Another object of the invention is to provide an improved combined mechanical and hydraulic drive mechanism for effecting movement of a machine tool member.

Another object of the invention is to provide an improved mechanical drive mechanism for effecting reciprocating movement of a member in combination with a hydraulic drive mechanism for effecting precise positioning of the member.

Another object of the invention is to provide in a milling machine, a reciprocally driven work or tool retaining member with auxiliary hydraulic drive means to effect precise positioning of the member at a predetermined point of reciprocation.

Another object is to provide an attachment for the drive mechanism of a machine tool to effect precision positioning of a reciprocating member thereof.

Another object is to provide an improved adjustable positive stop mechanism operative to precisely position a machine tool member advanced by an auxiliary driving mechanism.

Still another object of the invention is to provide a means operative to control the operating cycle of a secondary drive mechanism connected to effect precise positioning of a machine tool member.

According to this invention, an improved drive mechanism is provided to effect selective reciprocation and positioning of a machine tool element. The usual power driven screw and nut drive mechanism is operatively connected to positively reciprocate the member while a secondary drive mechanism serves to precisely position the member at some predetermined point of reciprocation. Individual control devices are actuated by the movement of the member to control the operation of the two drive mechanisms. An adjustable positive stop permits the member to be precisely positioned through operation of the secondary drive mechanism. Thus the reciprocation and positioning of the machine tool member may be coordinated for providing a predetermined automatic operating cycle such as is required to effect a series of machining operations on a workpiece.

The foregoing and other objects of this invention, which will become more fully apparent from the following detailed specification, may be achieved by the particular apparatus constituting an exemplifying embodiment of the invention that is depicted in and described in connection with the accompanying drawings, in which:

Figure 1 is an elevational view, in perspective, of a bed type milling machine in which the invention is embodied in manner to constitute a practical application thereof;

Fig. 2 is a top plan view of the machine showing the dual sets of spaced cutter heads with the movable work retaining member reciprocatably mounted therebetween, together with a schematic diagram of the hydraulic circuit for controlling the operation of secondary drive mechanism associated with the member; and Fig. 3 is a longitudinal sectional view of the reciprocating member and the two driving mechanisms therefor, taken on the plane of the line 3—3 in Fig. 2.

While the particular machine tool illustrated in the drawings, as exemplifying apparatus incorporating the principles of the present invention is a bed type milling machine, it is to be understood that the invention may be readily applied to other types of machines with equal effectiveness. Also, while the invention is disclosed herein as adapted to positively position a machine tool work retaining member at a predetermined point of reciprocation, the same principle may be used to position a tool retaining member, or any other movable member of the machine.

Referring more specifically to the drawings, and particularly to Fig. 1 thereof, the milling machine therein depicted as incorporating the invention in a practical operative embodiment, is of the bed type, as hereinafter described. As there shown, the structure comprises a hollow bed or base 5 which constitutes a frame to enclose the various driving mechanisms necessary for actuating the movable members slidably mounted thereon, in a well known manner. A work supporting table or member 6 is slidably mounted for horizontal longitudinal reciprocating movement in a saddle 7 fixedly supported in the base 5.

The table 6 supports a work retaining fixture 8 (Fig. 2) which is readily adapted to clamp a workpiece 9 while a machining operation is performed thereon. While the workpiece shown is a pinion gear shaft such as is used in automobile and truck differential gear assemblies, it is to be understood that other types of workpieces likewise can be machined. In the particular case, each end of the workpiece is milled and, thereafter, centered to facilitate further machining operations, such as turning, grinding and polishing the peripheral surfaces thereof.

In the particular instance, the machine is adapted to face mill each end of the workpiece 9 by feeding it through a pair of milling cutters 10 and 11, and thereafter precisely position it to permit a pair of centering cutters 12 and 13 to be axially advanced and cut a center hole or aperture in each end of the workpiece. Both machining operations are performed on the workpiece during a single operating cycle. The operating cycle is automatically controlled from predeterminately set trip dogs carried on the front face of the table 6 in a well known manner.

In order to advance the workpiece leftwardly from the loading position shown in Fig. 1 at either feed or rapid traverse rate, the conventional power driven screw and nut drive mechanism is adapted to drive the work retaining table 6. However, in order to precisely position the workpiece 9 for the centering operation in accordance with the invention, an auxiliary table drive mechanism 15 is provided. The conventional drive mechanism is operatively disconnected and the auxiliary drive mechanism 15 is connected to advance the table 6 to the final position before the centering operation is begun. Thereafter, the two centering cutters are advanced axially into engagement with the ends of the workpiece 9 while the table 6 is retained in this position. After the two machining operations have been completed and the centering cutters have been retracted, the table supporting the workpiece 9 is returned to the loading position whereat the operator can remove the finished workpiece and reload the fixture 8. A selectively adjustable positive stop mechanism 16, as shown in Figs. 1 and 2, is used to precisely locate the table for the centering operation.

The two face milling cutters 10 and 11 are each rotatably supported by power driven spindles (not shown) journalled in axially adjustable quills 18 and 19, which, in turn, are mounted in spindle blocks 20 and 21, respectively. Each of the spindle blocks is slidably mounted for vertical adjustment in its respective upright member 22 and 23 by means of the usual adjusting and locking mechanism 24 and 25, respectively. In the present instance, the two spindle blocks 20 and 21 are positioned to retain the cutter retaining spindles in axial alignment, with the quills 18 and 19 extended to permit the two cutters 10 and 11 to simultaneously machine the two ends of the workpiece 9. Thus, each successive workpiece machined will be of identical length.

As shown in Figs. 1 and 2, the centering cutters 12 and 13 are each retained in collets 26 and 27, respectively, fixedly locked in spindles 28 and 29. The spindle 28 is rotatably journalled in a ram member 30 slidably supported on the left side of the upright member 22 and is power driven from a motor 31 operably mounted on the member 30. Likewise, the spindle 29 is journalled in a ram member 32 slidably mounted on the left side of the upright member 23 and is power driven by a motor 33. Since the spindles 28 and 29 are in axial alignment, the centering cutters 12 and 13 may be axially advanced to engage the ends of the workpiece 9 and both center holes cut in the workpiece will be in perfect alignment with each other. Control mechanism is provided to advance and retract the two centering ram members 30 and 32 simultaneously when the workpiece 9 is properly positioned for the centering operation.

An automatic operating cycle is provided to advance the workpiece carried on the table 6 from the loading position shown in Fig. 1 through the two machining operations and then return it to the loading position. As shown in Fig. 3, a conventional screw and nut drive mechanism 35 is provided to drive the table 6 through the major portion of the operating cycle as will be hereinafter more fully described. A screw 36 constituting a part of the drive mechanism 35 is rotatably journalled at its ends in brackets 37 and 38 fixedly attached to the ends of the work retaining table 6, while a nut 39 is retentively locked in the saddle 7 and is in constant threaded engagement with the screw 36. Rotation of the screw 36 in the nut 39 serves to effect longitudinal movement of the table 6 in either direction selectively. Manual rotation of the screw is effected through the operation of a crank applied to the squared end of a shaft 40 rotatably journalled in an extension support 41 fastened to the end of the table bracket 37 at the left end of the table 6. The shaft 40 is disposed in axial alignment with the left end of the screw 36 and may be brought into clutching engagement therewith through the application of axial pressure to the end of the shaft in a well known manner.

The table 6 may be power driven at feed or rapid traverse rates by means of a motor and transmission (not shown) contained within the base 5. Thus, a gear 44 and shaft 45 driven from the transmission in the base is disposed to operate selectively at any one of a plurality of speeds. The gear 44 meshes with a gear 46 rotatably mounted on an intermediate shaft 47. The gear 46 is disposed to be shifted axially into engagement with either a gear 48 or a gear 49 through clutching engagement therewith, as shown in Fig. 3. The combination of the gears 46, 48 and 49, as shown, serves to constitute a reversing mechanism for effecting reversal in the direction of rotation of the table screw 36. The gear 48 meshes directly with a gear 50 on a gear cluster 51 rotatably journalled in the machine saddle 7 and in keyed engagement with the table screw 36. The gear 49 meshes with an intermediate gear 52 which, in turn, meshes with a gear 53 on the gear cluster 51. Since the reverse gear 46 can be selectively engaged with either the gear 48 or the gear 49 at a given instant, the gear cluster 51 will be driven in a clockwise or counterclockwise direction to effect either rightwardly or leftwardly movement of the table 6, respectively.

The usual manually or dog actuated control mechanism is provided to effectively control the starting, stopping or reversal of table movement and change in the rate of movement from feed rate to rapid traverse rate or vice-versa, in a well known manner. With this arrangement, it is possible to predeterminately set up an automatic operating cycle for the machine. The mechanical drive mechanism 35 is used to drive the work retaining table 6 from the loading position through the major part of the operating cycle. The table is moved at rapid traverse rate from the loading position to bring the workpiece within range of the face milling cutters 10 and 11. Thereafter, the table is driven at feed rate while the workpiece is fed through the milling cutters. After both ends of the workpiece 9 have been milled, the operating cycle is again varied to permit the table to operate leftwardly at rapid traverse rate and bring the workpiece clamped therein into the approximate range of the centering cutters 12 and 13. The table is then precisely positioned in accordance with the invention, as more fully explained hereinafter, and the centering cut taken. After the centering operation has been completed, the table is again driven by means of the screw and nut drive mechanism 35 at rapid traverse rate to return the workpiece to the loading position. If an indexable work retaining fixture 8, such as is shown in Fig. 2 is used, the operator merely indexes the fixture 180° to bring another workpiece into position for the succeeding dual cutting operations. In this case, the finished workpiece from the previous operation is removed from the fixture while the cutting operation on the next workpiece is taking place.

The secondary or auxiliary drive mechanism 15 serves to effect the precision positioning of the workpiece between the two centering cutters. In order to permit successful turning operations to be performed on the workpiece, it is necessary that the stock be evenly divided. Thus, the centering cutter must be precisely centered in relation to the diameter of the ends of the workpieces to facilitate further operations thereon.

This is accomplished by moving the table 6 and its associated end brackets 37 and 38 relative to the table screw 36, through operation of the auxiliary drive, into engagement with the posiive stop. To permit movement of the table, slidable sleeves 55 and 56 are provided to carry the ends of the table screw 36 in the end brackets 37 and 38, respectively, as shown in Fig. 3. A roller bearing 57, disposed to support the left end of the screw 36, is securely mounted in the sleeve 55 which, in turn, is slidably mounted in the end bracket 37 secured to the left end of the table 6. A key 58 interposed between the sleeve 55 and the end bracket 37 serves to restrain the sleeve and its associated parts from rotating with the screw shaft 36 and yet permits the sleeve unit to move axially in relation to the end bracket.

The auxiliary table drive mechanism 15 comprises essentially a piston 60 attached to the right end of the table screw 36 and operably mounted within a cylinder 61 integrally formed in the table end bracket 38, together with control mechanism 62 designed to admit hydraulic fluid to one or the other end of the cylinder during various portions of the operating cycle. When the control mechanism 62 is actuated at predetermined points of the operating cycle, the hydraulic fluid is admitted to one of the two ends of the cylinder 61. Since the piston 60 is attached to the end of the screw 36, the admission of fluid into the cylinder 61 will cause the end bracket assemblies 37 and 38 and the table 6 to be longitudinally displaced relative to the feed screw 36.

A pair of thrust bearings 63 and 64 supporting the right end of the feed screw, as shown in Fig. 3, are carried in the sleeve member 56. The bearing 63 is retained therein by means of a combination oil seal and locking ring 65. The sleeve member 56 is slidably mounted in the end bracket 38 and is restrained against rotation therein by means of a key 66.

The piston 60 is bolted to the end of a rod member 67, integrally formed with a threaded cap portion 68. The cap is threadedly retained in the right end of the sleeve 56 and is locked therein by means of a set screw 69. The bearing 64 is locked on the screw shaft 36 by means of an adjustable locking nut 70 which serves to effect the adjustment of both of the bearings 63 and 64. Both bearings are lubricated from an oil cup and passageway 71 provided in end bracket 38, and connecting with a passage 72 in the sleeve 56 joining with a central reservoir 73 between the two bearings 63 and 64. Since the sleeve and bearing assembly together with the piston 60 is secured to the end of the screw shaft 36 and is restrained against rotation by means of the key 66, only longitudinal movement of the end brackets and table relative to the feed screw 36 is possible when the auxiliary drive mechanism 15 is energized.

The piston 60 is attached to the rod 67 after the aforedescribed assembly is in place within the end bracket 38. A cylinder cap 74 is bolted to the right end of the cylinder 61 and serves to define the right end of the cylinder cavity. When hydraulic fluid is admitted to this end of the cylinder, the table assembly 6 is forced rightwardly while the admission of fluid into the cavity at the left end of the cylinder will force the table assembly 6 leftwardly. An oil seal packing ring 75 is disposed about the rod member 67 between the cylinder and the cavity surrounding the sleeve 56, in order to prevent any of the hydraulic fluid from flowing into the latter cavity.

In the particular operating cycle aforedescribed, the mechanical screw and nut drive mechanism 35 serves to effect movement of the table assembly supporting the workpiece 9 until the workpiece is brought within the approximate range of the two centering cutters 12 and 13. At this point, the power drive to the screw and nut mechanism 35 is disconnected automatically. At the same instant, a predeterminately positioned trip dog 78, as diagrammatically shown in Fig. 2, will depress a plunger 79 operatively extending from a control valve 80 to actuate a piston 81 therein. With the piston 81 depressed, as shown in the drawing, a pump 82 will supply hydraulic fluid from a sump 83 via a supply line 84 to a recess 85 in the piston 81 and, thereafter, via a port 86 to a line 87 connecting with a reverse valve 88. With the valve 88 positioned as shown in Fig. 2, the fluid will flow through the valve to a line 89 connecting with the left end of the cylinder 61. The admission of fluid into this end of the cylinder will force the end bracket 38 and the table 6 attached thereto leftwardly. Such leftwardly movement will continue until a selectively positionable member 90 of the positive stop device 16 on the rear side of the table 6 abuts against an extending arm 91 on the upright member 22. When the abutment occurs, the workpiece 9 will be precisely positioned between the two centering cutters 12 and 13 and thereafter, the operating cycle of the two centering ram members 30 and 32 will serve to advance the heads and permit the centering operation to be performed on each end of the workpiece simultaneously. During this time, the piston 81 in the control valve 80 will remain depressed to retain fluid under pressure in the left end of the cylinder 61 and thereby lock the table in position.

While the table 6 is being advanced leftwardly through the operation of the auxiliary drive mechanism 15, fluid in the right end of the cylinder 61 will be forced out of the cylinder into a line 92 and through the reverse valve 88 into a line 93. This line connects with a port 94 in the control valve 80, which is then in alignment with a central passage 95 in the piston 81. This passage is always in communication with a port and exhaust line 96 disposed to carry the hydraulic fluid back to the sump 83.

After the centering operation has been completed and the cutters 12 and 13 have been withdrawn from the workpiece 9, the operating cycle is continued by restarting the screw and nut drive mechanism whereby the work table 6 is driven at rapid traverse rate to return the workpiece to the loading position at the right end of the machine. When this occurs, the plunger 79 on the control valve 80 will ride off of the trip dog 78 and permit the piston 81 to return to its normal position. At this time, the recess 85 in the piston 81 will no longer connect the feed line 84 with the line 87 and, consequently, the pressure feed to the left end of the cylinder 61 in the auxiliary drive mechanism 15 will be interrupted. Instead, a recess 97 in the control valve piston 81 will effect a connection for passage of the fluid from the feed line 84 via the port 94 to the line 93. Thus, the pressurized fluid will be pumped through the line 93 and the reverse valve 88 to the line 92 connecting with the right end of the cylinder 61. The admission of fluid into this end of the cylinder will force the end bracket 38 and the table assembly 6 to move rightwardly relative to the table screw 36. When this movement occurs, hydraulic fluid in the left end of cylinder 61 will be exhausted through the line 89, the reverse valve 88 and the line 87 to the exhaust line 96 via the passage 95 in the piston 81 which is then in alignment with the port 86. As long as the control valve plunger 79 remains out of engagement with the trip dog 78, the hydraulic fluid pressure will be directed to the right end of the cylinder 61 and, consequently, will lock the table 6 in the extreme rightward position relative to the table screw 6. The table will remain in this position until such a time as a succeeding operating cycle is instituted to bring the workpiece 9 into the approximate range of the centering cutters 12 and 13.

It should be noted that the aforedescribed operating cycle of the auxiliary table drive mechanism 15 is fully automatic. It is particularly advantageous in that a workpiece may be precisely positioned for a cutting operation without placing undue strain on a mechanical drive mechanism. While modified versions of the invention are not shown in the drawings, it is readily conceivable that an electrical actuated solenoid or other electrical, hydraulic or mechanical devices could be readily adapted together with appropriate control mechanism in place of the auxiliary drive mechanism 15 previously described to effect such additional positioning movement of the table 6. The reverse valve 88 is positioned, as shown in Fig. 2, when the operating cycle originates from the right end of the machine, as aforedescribed. If the operating cycle was adapted to start with the table moving rightwardly, the reversing valve would necessarily have to be repositioned to permit hydraulic fluid flow to the opposite ends of the cylinder 61 from that described. In that case, the fluid from the line 87 would be directed through the valve to the line 92, while the fluid from the line 93 would be directed to the line 89 joining with the left end of the cylinder 61. Otherwise, the operating cycle would remain the same as described.

With the invention herein disclosed, it is possible to effect an automatic operating cycle in which a machine tool member may be stopped at any point during its movement to permit precision centering, drilling, reaming or other operations of this nature to be performed by means of an auxiliary drive mechanism and thereafter, continue the operating cycle to completion. The movable member controlled in this manner may be either of a work retaining type or a cutter retaining type. The auxiliary type drive mechanism may be readily combined with any of the usual types of machine tool drive mechanisms with equal effectiveness. Furthermore, it can be adapted as an attachment for a standard type machine tool, in which case it is merely necessary to remove the end brackets, replace them with brackets incorporating the auxiliary type drive mechanism 15, and install the necessary control mechanism 62.

Although the apparatus shown in the drawings has been described in considerable detail for the purpose of fully setting forth a machine tool embodying the invention, it is to be understood that the structure herein described is intended to be illustrative only and that the various novel features of the invention may be incorporated in other structural forms without departing from the spirit and scope of the invention, as defined in the subjoined claims.

The principles of the invention having now been fully explained in connection with the foregoing description of an illustrative preferred embodying structure, we hereby claim as our invention or discovery:

1. In a machine tool, a base, a member reciprocally mounted on said base, a mechanical drive mechanism connected to reciprocate said member, a selectively adjustable control means operative on said drive mechanism to effect reciprocation of said member according to a predetermined operating cycle, a hydraulic drive means operatively disposed to effect additional movement of said member beyond the selected range of movement of said mechanism, and a second selectively adjustable control means operative on said hydraulic means including means causing said hydraulic drive means to be actuated upon said member reaching a predetermined point of travel.

2. In a drive mechanism for a machine tool, a reciprocable member slidably carried on a base, a screw and nut drive mechanism operatively connected to effect reciprocative movement of said member, a control means disposed to manually or automatically control the operation of said drive mechanism, a hydraulic drive mechanism connected to said first mentioned drive mechanism and to said reciprocable member, a second control means connected to said hydraulic drive mechanism and disposed to effect accurately controlled movement of said member beyond the selected range of reciprocation as effected by said first mentioned drive mechanism, and a positive stop device against which said member may be precisely positioned by said controlled movement.

3. A machine tool power drive mechanism comprising a frame, a reciprocating member slidably carried on said frame, a power source, a transmission connectibly driven from said power source, a feed screw journalled for rotative and axial movement on said member, a nut mounted in said frame and threadably engaging said screw, a reversing mechanism driven from said transmission and connected to drive said screw in either direction selectively, a piston attached to said screw, a cylinder in said reciprocating member disposed to operatively receive said piston and hydraulic control means connected to admit fluid to said cylinder selectively whereby said reciprocating member may be selectively moved a predetermined distance after said screw has stopped rotating.

4. A reciprocating power driven member for a machine tool comprising a base to slidably retain said member, a screw and nut drive mechanism operatively connected to effectively reciprocate said member, a power driven transmission geared to said drive mechanism, a hydraulic piston attached to said screw, a cylinder attached to said reciprocating member and disposed in axial alignment to operatively receive said piston, an automatic hydraulic actuating and control mechanism including a circuit connecting with said cylinder to effect relative movement between said screw and said reciprocating member and an adjustable positive stop against which said member may be moved whereby said member may be power driven into the approximate range of said stop and thereafter precisely moved into engagement with said stop by means of said hydraulic actuating means.

5. A power drive means to effect power movement of a movable machine tool member comprising, a base, a movable member slidably carried on said base, a power driven screw and nut mechanism mounted in said base and connected to drive said member selectively according to a predetermined operating cycle, a hydraulic piston attached to said screw and nut mechanism, a cylinder attached to said movable member and disposed to slidably receive said piston, a control means operative to admit fluid selectively to the ends of said cylinder and thereby effect relative movement between said screw and said movable member at a predetermined point of said operating cycle.

6. In a machine tool, a frame, a carriage slidably mounted on said frame for reciprocatory movement, a nut fixed in said frame, a propelling screw rotatably and slidably mounted in said carriage and having threaded engagement with said fixed nut, a hydraulic cylinder and piston mechanism arranged to effect limited sliding movement of said carriage relative to said propelling screw, a positive stop disposed to engage said carriage at a predetermined position in the course of its movement, power actuated means selectively connectible to rotate said screw for advancing said carriage, trip mechanism responsive to movement of said carriage and operative to disconnect said power actuated means upon said carriage approaching to within a predetermined distance from said stop, and trip mechanism operative upon said carriage approaching said stop to effect actuation of said hydraulic cylinder and piston mechanism in manner to effect positioning movement of said carriage into contact with said positive stop with predetermined pressure.

7. In a machine tool comprising a frame, a carriage slidably mounted on said frame for reciprocating movements, a screw and nut mechanism disposed to effect traversing movements between said carriage and said frame, a hydraulic piston and cylinder mechanism disposed to effect positioning movements between said carriage and said screw and nut mechanism, a positive stop disposed to be engaged by said carriage upon its arriving at a predetermined position in its course of travel, and trip mechanism disposed to be actuated by said carriage upon approaching said positive stop and operative to energize said hydraulic piston and cylinder mechanism for effecting a final positioning movement of said carriage into engagement with said positive stop with predetermined constant force.

8. In a machine tool carriage positioning mechanism, the combination with a base, a carriage slidably mounted on said base for reciprocating movement, and a screw and nut actuating mechanism interposed between said base and said carriage for effecting traversing movements of said carriage, of an auxiliary hydraulic actuating mechanism arranged in series relationship with said screw and nut mechanism for effecting positioning movements of said carriage, and a positive stop carried by said base in position to engage said carriage for stopping it at a precisely predetermined position, whereby said carriage may be advanced into proximity with said stop by operation of said screw and nut actuating mechanism and then brought into engagement with said stop with predetermined pressure by operation of said auxiliary hydraulic positioning mechanism to precisely position said carriage in predetermined relationship with said base.

9. In a machine tool comprising a frame, a carriage slidably mounted on said frame, and a screw and nut propelling mechanism interposed between said frame and said carriage for effecting relative operating movements therebetween, an auxiliary hydraulic actuator arranged in series relationship with said screw and nut mechanism in manner to constitute with it a complete driving connection between said frame and said carriage, means to operate said screw and nut mechanism to advance said carriage along said frame, a positive stop disposed on said frame in position to engage said carriage for stopping it at a predetermined position, and trip mechanism responsive to movement of said carriage in approaching said stop and operative to discontinue operation of said screw and nut mechanism and to initiate operation of said auxiliary hydraulic actuator, whereby said carriage may be advanced into engagement with said positive stop at selected positioning rate and held against said stop with selected uniform pressure to position said carriage in a precisely predetermined relationship with said frame.

10. In a machine tool comprising a frame and a carriage slidably mounted on said frame, a screw and nut mechanism interposed between said frame and said carriage for effecting relative movement therebetween, a hydraulic actuator arranged in series relationship with said screw and nut mechanism between said frame and said carriage, a positive stop fixed on said frame and disposed to be engaged by said carriage at a precisely predetermined position in the course of its movement, trip mechanism operative by said carriage upon approaching said positive stop under movement by said screw and nut mechanism, and control apparatus responsive to said trip mechanism upon actuation by said carriage and operative to discontinue movement of said carriage by said screw and nut mechanism and to continue movement thereof by said hydraulic actuator, whereby said carriage may be advanced into engagement with said positive stop at reduced rate and with predetermined steady pressure to position it precisely at a predetermined position relative to said frame.

WILLIAM K. ANDREW.
ARTHUR H. FOTSCH.

REFERENCES CITED

The following references are of record in the file of this patent:

UNITED STATES PATENTS

| Number | Name | Date |
|--------|------|------|
| 1,956,110 | Turrettini | Apr. 24, 1934 |
| 2,159,207 | Godfriaux | May 23, 1939 |
| 2,333,256 | Kline | Nov. 2, 1943 |
| 2,357,514 | Huennekens et al. | Sept. 5, 1944 |
| 2,453,678 | Silven | Nov. 9, 1948 |